Feb. 20, 1923.
G. H. HINCHLIFFE
MIXING MACHINE
Filed Nov. 8, 1920
1,446,183
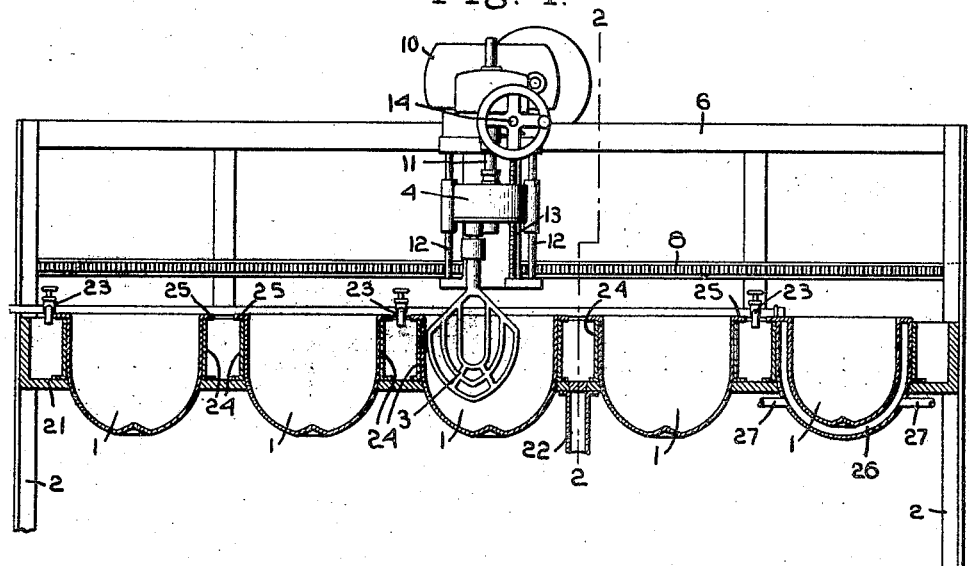
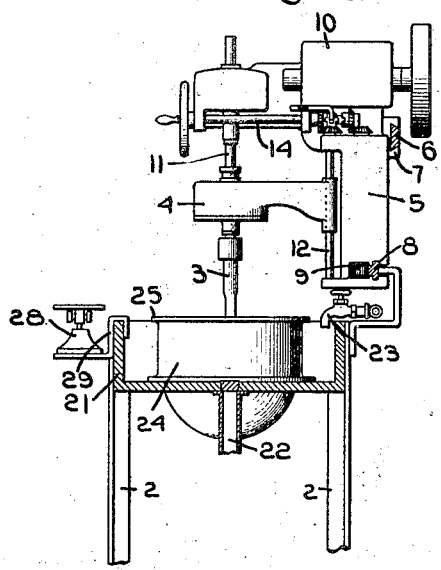
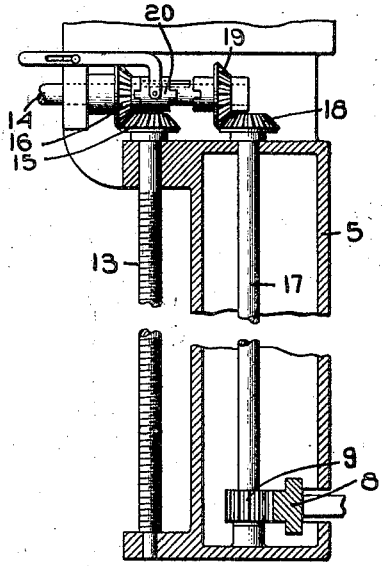
Inventor.
George H. Hinchliffe
by Heard Smith & Tennant.
Attys Patented Feb. 20, 1923.

1,446,183

UNITED STATES PATENT OFFICE.

GEORGE H. HINCHLIFFE, OF BOSTON, MASSACHUSETTS.

MIXING MACHINE.

Application filed November 8, 1920. Serial No. 422,430.

*To all whom it may concern:*

Be it known that I, GEORGE H. HINCHLIFFE, a citizen of the United States, and resident of Boston, county of Suffolk, State of Massachusetts, have invented an Improvement in Mixing Machines, of which the following description, in connection with the accompanying drawing, is a specification, like characters on the drawing representing like parts.

This invention relates to mixing machines such as are used in bakeries, hotels, restaurants and similar places for mixing dough, batter, cake, fondant, etc. One of the objects of the invention is to provide an improved mixing machine which comprises a plurality of mixing bowls and a beater, which is shiftable from one to another of the mixing bowls and adapted to perform the mixing operation in anyone of the bowls. Another object of the invention is to provide a mixing machine in which the mixing bowl is set into or is surrounded by a sink so that any of the material in the bowl which spills or boils over will fall in the sink where it can easily be drained out. Other objects of the invention are to improve mixing machines in various respects all as will be more fully hereinafter set forth.

In order to give an understanding of my invention I have illustrated in the drawings a selected embodiment thereof which will now be described after which the novel features will be pointed out in the appended claims.

Fig. 1 is a front view partly in section of a mixing machine embodying my invention.

Fig. 2 is a section on the line 2—2, Fig. 1.

Fig. 3 is an enlarged view of the gearing for shifting the position of the beater element.

As stated above one of the objects of my invention is to provide a mixing machine having a plurality of mixing bowls and a single beater element adapted to cooperate with anyone of the bowls. The mixing bowls are indicated at 1 in Fig. 1 and any number may be used without departing from the invention. These mixing bowls are supported in a suitable frame work 2 and will preferably be arranged in a row.

3 indicates a beater which is adapted to be introduced into any one of the bowls 1 for the purpose of mixing the material therein. The beater 3 is shown as carried by a head 4 by which it is rotated and the head is in turn carried by a carriage 5 which is mounted on the frame for movement longitudinally thereof so that the beater can be brought into position to operate in anyone of the bowls 1. For this purpose the frame is provided with a track 6 extending longitudinally thereof and the carriage 5 is provided with ways 7 which engage the track 6. This track 6 is preferably dove-tailed in cross section so as to more securely hold the carriage thereon. The frame is also provided with a longitudinally extending rack 8 and the carriage 5 has a pinion 9 meshing with the rack so that by rotating the pinion the carriage 5 may be moved longitudinally of the frame. The carriage 5 supports some suitable driving mechanism indicated generally at 10 for rotating the shaft 11 by which the beater 3 is operated and this driving mechanism may be a power mechanism so that the beater 3 will be rotated by power or it may be a hand driven mechanism as desired. The head 4 is mounted for vertical movement to permit the beater to be raised out of or moved down into the bowls 1. For this purpose the head is guided in its vertical movement on guiding heads 12 carried by the carriage and is adjusted vertically by means of a feed screw 13.

The feed screw is operated from a shaft 14 mounted in the carriage and which is geared to the feed screw through suitable bevelled gearing 15, 16.

I have also provided herein means whereby the carriage 5 may be shifted longitudinally of the track by the rotation of the shaft 14. For this purpose the pinion 9 which engages the rack 8 is carried by a shaft 17 that is journalled in the carriage and has at its upper end a bevelled gear 18 meshing with a bevelled gear 19 loosely mounted on the shaft 14. The bevelled gear 16 is also loosely mounted on the shaft 14 and a sliding clutch member 20 is provided for clutching either gear 16 or 19 to the shaft. When the gear 16 is clutched to the shaft then the rotation of the shaft 14 will raise and lower the head 4 and when the gear 19 is clutched to the shaft the rotation of said shaft will shift the carriage 5 and the beater longitudinally of the frame.

The advantage of this construction is that the single beater can be used for all of the mixing required in an ordinary restaurant, hotel, or bakery because the food ingredients forming the different food preparations that are to be mixed may be placed in the different bowls 1 and the carriage 5 may be shifted so as to mix the materials in any bowl. In the practical use of mixing machines it not infrequently happens that after one batch of dough or fondant has been mixed it is desirable to mix another batch of some other material before the first batch has been used and with my machine this can be done because after having mixed a batch of dough or other material in one bowl the operator may proceed to mix a batch of a different material in another bowl without waiting for the first named bowl to be emptied. This is a very great advantage and with this machine it would be possible for a single operator to do all the mixing necessary in an ordinary hotel or restaurant.

Another feature of my invention relates to the placing of the bowl or bowls in a sink structure so that any material which spills out of the bowls will be caught instead of dropping to the floor.

In the present embodiment of my invention the frame 2 supports a sink structure 21 in which each of the bowls 1 are mounted. This sink structure is provided with a drain pipe 22 and has associated therewith one or more faucets 23 by which water may be flushed into the sink. With this arrangement any material which spills over anyone of the bowls will flow into the sink and the sink can always be kept clean by flushing it out. My machine is therefore entirely sanitary and prevents the annoyance which comes from the material being mixed spilling onto the floor.

The bowls 1 may be supported in the sink in any suitable way. I have herein shown the sink as provided with bowl-receiving apertures each surrounded by a curb or circular flange 24, said bowls being received in said apertures and supported on the curb. For this purpose the upper edge of each bowl is surrounded by a flange 25 which rests on the upper edge of the curb.

The bowls 1 may be arranged to be heated so that they act as steam cookers or they may be arranged to be cooled so they would act as freezers, thus enabling me to mix material while it is cooking or while it is freezing. I have shown at the right in Fig. 1 a bowl in the nature of a double boiler it having a jacket 26 in which steam may be admitted through pipes 27. Or if desired a refrigerant may be admitted into the jacket. This feature may be applied to anyone or more of the bowls as desired.

In the practical use of mixers of this type it is customary to weigh the ingredients which are put into any batch and in many instances to weigh the amounts of dough or other material which are taken out of the bowl to form loaves so that all the loaves will have the same size. To facilitate this weighing I propose to mount a pair of scales 28 on the front of the sink. These scales are shown as supported on a bracket 29 which may be moved longitudinally of the sink and into position adjacent any bowl.

I claim:

1. In a mixing machine, the combination with a sink having bowl-receiving apertures each surrounded by a curb, of a mixing bowl removably sustained by each curb and occupying the corresponding aperture, a track situated above the sink, and a beater device movable on the track and adapted to operate in anyone of the mixing bowls.

2. In a mixing machine, the combination with a frame, of a plurality of mixing bowls stationarily but removably sustained thereby and arranged in a row, a track on the frame above the bowls, a carrier movable along the track, and a beater sustained on said carrier and capable of vertical movement relative thereto, whereby movement of the carrier on the track brings the beater over anyone of the bowls and vertical movement of the beater on the carrier brings the beater into position to operate in said bowl.

3. In a mixing machine, the combination with a frame, of a plurality of mixing bowls stationarily but removably sustained thereby, a carriage movably mounted on the frame and a beater mounted on said carriage, said carriage being movable so as to bring the beater into position to operate in anyone of the bowls.

4. In a mixing machine, the combination with a sink structure having a bowl-receiving aperture surrounded by a curb, of a mixing bowl occupying said aperture and removably sustained by the curb, and a beater for mixing material in said bowl.

5. In a mixing machine, the combination with a sink structure having a plurality of bowl-receiving apertures, each surrounded by a curb, of a mixing bowl removably sustained by each curb and occupying the corresponding aperture, and a beater movably carried by the frame and adapted to operate in anyone of the mixing bowls.

6. In a mixing machine, the combination with a sink having bowl-receiving apertures each surrounded by a curb, of a mixing bowl removably sustained by each curb and occupying the corresponding aperture, a track situated above the sink, a beater device movable on the track and adapted to operate in anyone of the mixing bowls, and a driving mechanism on the carriage for operating the beater.

In testimony whereof, I have signed my name to this specification.

GEORGE H. HINCHLIFFE.